J. E. BUXTON & T. J. HOWE.

Harvester.

No. 6,351.

Reissued March 30, 1875.

Witnesses:

Edw. W. Down

Frank L. Sherman

Inventors:

Jno. E. Buxton &

Thos. J. Howe.

L. Deane, atty

THE GRAPHIC CO. PHOTO-LITH. 39 & 41 PARK PLACE, N.Y.

UNITED STATES PATENT OFFICE.

JOHN E. BUXTON AND THOMAS J. HOWE, OF OWATONNA, MINNESOTA.

IMPROVEMENT IN HARVESTERS.

Specification forming part of Letters Patent No. 147,477, dated February 17, 1874; reissue No. 6,351, dated March 30, 1875; application filed October 10, 1874.

*To all whom it may concern:*

Be it known that we, JOHN E. BUXTON and THOMAS J. HOWE, of Owatonna, in the county of Steele and State of Minnesota, have invented certain new and useful Improvements in Harvester-Rakes; and we do hereby declare that the following is a full, clear, and exact description thereof, that will enable others skilled in the art to which it appertains to make and use the same, reference being had to the accompanying drawings and to the letters of reference marked thereon, which form a part of this specification.

Our invention relates to an improvement in harvester-rakes; and consists in, first, a platform which is widest at the sickle-bar, and which tapers as it sweeps backward on a curve, gradually rising as it recedes from the bar, so that its rear end is raised high enough above the ground to form a platform, on which the grain is bound; second, in the arrangement and combination of devices, which will be more fully described hereafter, whereby the rake is operated and made to expand and contract according to the width of the platform.

Figure 1:
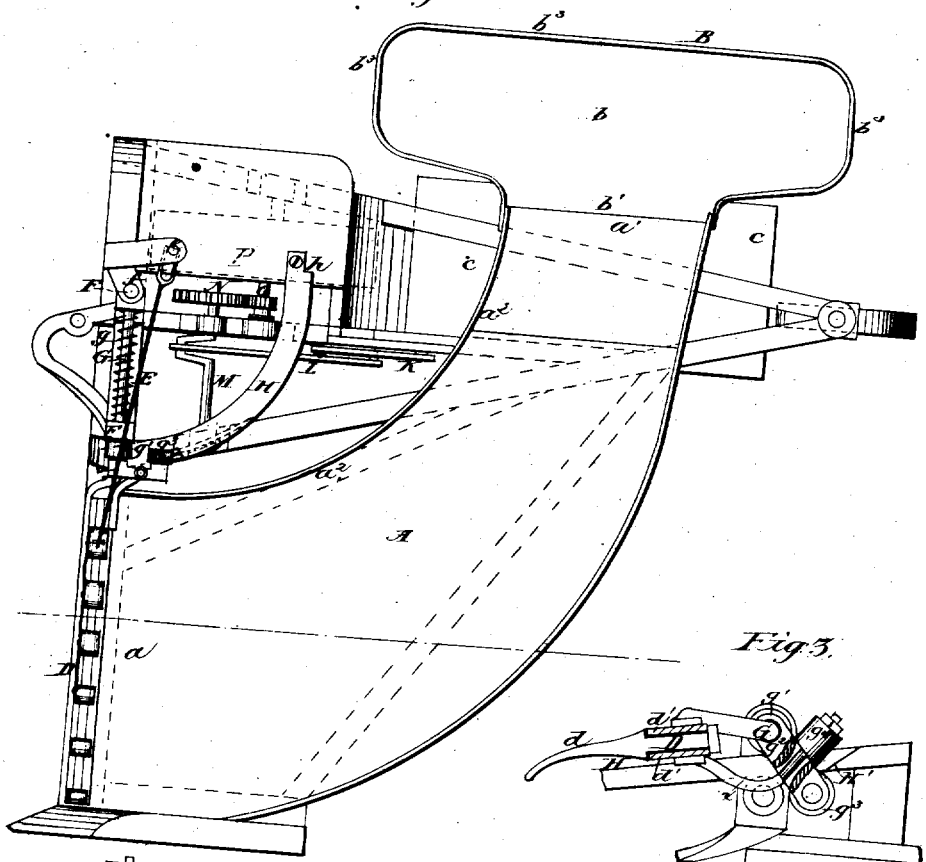
Figure 3:
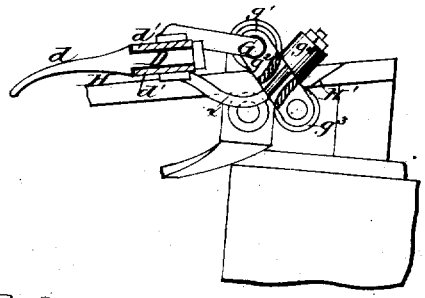
Figure 2:
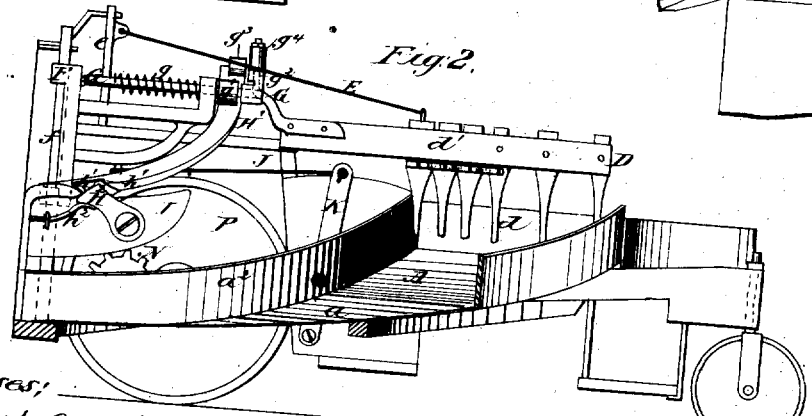

Figure 1 is a plan view of our invention. Fig. 2 is a longitudinal vertical section of the same. Fig. 3 is a detail view.

A represents the harvester-platform, having its front end secured to the rear side of the sickle-bar, its rear end being supported in the usual manner upon a caster-wheel. This platform is widest at the point *a*, where the straw and grain falls as it is cut, then narrows and curves backward, gradually rising as it recedes from the sickle-bar until at the point *a'*, at its rear end, it is narrower and higher than at any other point. This platform is of such a shape that, as its outer side or edge rises toward the delivery end, its upper surface remains level with any line drawn from this outer edge to the center of motion of the sweep of the rake; or a line drawn from the outer edge of the platform, at right angles to the post or pintle upon which the rake moves, will strike the whole face of the platform. To the rear end of this platform is secured a second horizontal platform, *b*, the two ends of which form tables upon which the binders on the two stands *c* bind the bundles as fast as they are delivered at the point $b^1$ by the rake. This arrangement of these parts enables each binder to have easy access to the bundle in the middle, and yet to be unimpeded by it while tying a preceding one. Around the edges of this platform *b* is formed a flange, $b^3$, which prevents the shelled grain that is swept up along with the bundles from being wasted. As there is always more or less of this grain, the amount saved in a single day's use of the machine is considerable. The platform being decreased in width as it turns upward, the grain and straw have a tendency to fall backward against the rake as it is being swept toward the binding-platform, while the decreasing width of the sides evens the butts so as to save the binders the trouble of arranging the parts, and thus enables them to work more rapidly and thoroughly. The teeth *d* of the vibratory rake D are flexibly connected, the one at the inner end being connected to the end of the rod E, which is made fast at its rear end to a rock-shaft, *e*. The teeth *d* are placed between the two bars *d'*, and may all be made movable, or the outer ones may be rigidly held and the inner ones alone made movable. As the rake rises and approaches the rear side *a* of the platform the rod E pushes out the inner end tooth more and more, this continuing until the delivery-point *a'* is reached. The rake is connected with the spindle *f* by a reciprocating hinge, F, and a rocking shaft, G, the shank being journaled in the hinge and being provided with a spiral spring, *g*, which exercises a constant tension and tends to turn it toward the rear. On this shank G is a friction-roll, $g^1$, and an arm, $g^2$, which is also provided with a friction-roll, $g^3$. When the rake moves up it is gradually raised by the correspondingly-rising track H, on which rest the friction-rolls $g^1$ $g^3$, the latter roll being held thereto by the spring. This has the effect of regulating the position of the rake and its teeth. At the top of the track H is a recess, *h*, and thereunder a second track, $H^1$, against which bears the friction-roll $g^3$ on its return. The two tracks meet at a sharp angle just at the recess *h*. When the friction-roll $g^3$ reaches the notch *h* the tension of the spring *g* upon arm $g^2$ causes the shank G to turn and the rake-teeth to be lifted off the platform A, while the bearing of roll $g^3$ against the subjacent track $H^1$ prevents the rake from changing its position until it reaches the notch $h^1$. $H^2$ is an auxiliary track pivoted on a projection, I, having its upper edge arranged in the recess $h^1$, and supported upon spring $h^2$, that is more powerful than spring $g$, so that it will not yield to the pressure of roll $g^3$ in passing over its top. When, however, the roll $g^3$ is brought against its edge $i$ by the backward oscillation of the hinge, it is compelled to yield until the roll has come under the recess $h^1$, the roll being then forced up and caused to take its position on the track $H^2$. The rake is then ready to make another sweep around, collect the straw, butt the ends evenly, and transfer the gavel, with all the shelled grain that may be on the platform, to the binder's platform. The spring $g$ also assists the rake-teeth in extricating themselves from a large bundle.

In order to vibrate the hinge F back and forward and thus move the rake, we attach the pitman J to the upper end of the bar K, that is pivoted at the lower end to the frame, and oscillated by a rod, L, crank M, gear N O, and large wheel P. The teeth are curved inwardly, as shown in the drawing, to conform to the motion of the rake when coming down to the platform, and for helping to relieve it from the bundle when it is raised. A small rubber spring, $g^4$, is arranged on the brace-rod $x$, which passes through arm $g^2$, between said arm and nut on the brace-rod that connects with the rake-head. When the rake goes down for a bundle, this spring allows the teeth to yield upwardly and thus go only partially through the bundle. This also relieves the strain on the parts as the roll $g^3$ goes up through the aperture $h^1$.

If all the gavels could be of the same size, there would be no necessity for this spring; but as that cannot be, owing to the difference in the stand or number of straws on the same area in various portions of the field, some provision is necessary to secure a yielding pressure.

Having described our invention, we claim—

1. The harvester-platform extending backward and upward on a regular curve in a spiral plane, narrower at its rear than at its front, and combined with a binder's stand or stands, and platform at its rear, substantially as and for the purposes set forth.

2. In combination with the harvester-platform A, rising, receding, and narrowing in a spiral plane, as set forth, the rake D $d$ $d'$, journaled in a rising hinge, F, and guided by the rising track H, substantially as described.

3. The rubber spring $g^4$, brace-rod $x$, and arm $g^2$, combined with rake-head, substantially as described.

4. A harvester-rake having teeth flexibly connected and alternately contracted and expanded by a push-rod, E, substantially as and for the purpose specified.

5. A rake-shank, G, journaled in a rising hinge, F, and provided with spring $g$, roll $g^1$, arm $g^2$, and roll $g^3$, in combination with a rising track, H, substantially as and for the purpose described.

6. The two tracks H $H^1$, having a junction at the notches $h$ $h^1$, combined with the spring-supported auxiliary track $H^2$ and the pivoted rake-shank G, having the spring-vibrated arm $g^2$, substantially as and for the purpose set forth.

In testimony that we claim the foregoing we have hereunto set our hands this 1st day of October, 1874.

JOHN E. BUXTON.
THOMAS J. HOWE.

Witnesses:
LEWIS L. WHEELOCK,
EDWIN K. BURCH.